United States Patent [19]

Theissen

[11] 3,862,209

[45] Jan. 21, 1975

[54] PROCESS OF MAKING NITRO PHENOXYBENZOIC ACID ESTERS

[75] Inventor: Robert James Theissen, Union County, N.J.

[73] Assignee: Mobil Oil Corporation, New York

[22] Filed: May 12, 1972

[21] Appl. No.: 252,780

[52] U.S. Cl. .......................................... 260/471 R
[51] Int. Cl. .......................................... C07c 101/54
[58] Field of Search ............................... 260/471 R

[56] References Cited
UNITED STATES PATENTS 3,013,054   12/1961   Richter .................. 260/501.16

Primary Examiner—Lorraine A. Weinberger
Assistant Examiner—L. A. Thaxton
Attorney, Agent, or Firm—Charles A. Huggett; Howard M. Flournoy

[57] ABSTRACT

Improved process for the synthesis of certain nitro phenoxybenzoic acid esters in which high yield, high purity, herbicidally effective compounds are obtained. In general the improvement comprises:

1. esterification of a halobenzoyl halide with isopropanol thereby facilitating separation of isomeric impurities from the desired isopropyl-nitrobenzoate ester intermediate.
2. transesterification of a phenoxy derivative of said ester to the desired phenoxybenzoic acid ester.

9 Claims, No Drawings

PROCESS OF MAKING NITRO PHENOXYBENZOIC ACID ESTERS

CROSS-REFERENCE TO RELATED APPLICATIONS

This application is related to Ser. No. 819,412, filed Apr. 25, 1969 now U.S. Pat. No. 3,652,645, and Ser. Nos. 194,479 now U.S. Pat. No. 3,776,715, 194,480 now abandoned and 194,481 now abandoned, all filed Apr. 16, 1970, and all entitled HALOPHENOXYBENZOIC ACID HERBICIDES and Ser. No. 114,712 now U.S. Pat. No. 3,784,635, filed Nov. 19, 1970 and entitled SUBSTITUTED PHENOXYBENZOIC ACIDS AND DERIVATIVES THEREOF AS HERBICIDES. Ser. Nos. 194,479, 194,480 and 194,481 are divisions of Ser. No. 819,412. Ser. No. 114,712 is a C-I-P of 819,412.

BACKGROUND OF THE INVENTION

1. Field of the Invention

This invention is concerned with a novel process of making certain phenoxybenzoic acid compounds which are useful as herbicides.

2. Description of the Prior Art

In U.S. Pat. No. 3,013,054, French Pat. No. 1,502,538, and co-pending U.S. Ser. No. 819,412 respectively the use of 2-methoxybenzoic acids, 4-phenoxybenzoic acids, and 5-phenoxybenzoic acids as herbicides is disclosed.

These compounds are readily prepared by the Ullman ether synthesis reaction between, for example an alkali metal salt of a halophenol and a halonitrobenzoic acid. An amide, ester or salt of the benzoic acid may be used, however, the ester is preferred. The halonitrobenzoic acid can be prepared by nitrating a halotoluene and subsequently oxidizing the methyl group, or by subjecting the acid to direct nitration.

However, prior art methods of synthesizing these compounds often resulted in low yields of the desired product or a product containing undesirably high amounts of impurities or both. It is the discovery of this invention that the subject phenoxybenzoic acid esters can be synthesized in high yields with a minimum amount of impurities.

SUMMARY OF THE INVENTION

This invention provides an improved process for making herbicidally effective compounds having the following general structure:

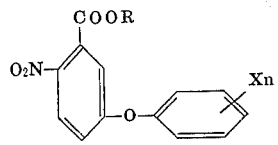

where R is alkyl ($C_1 - C_5$) branched or unbranched, X is a member selected from the group consisting of hydrogen, iodine, fluorine, chlorine and bromine, and $n$ is an integer from 2 to 5, and in which compound at least one X is not hydrogen.

More specifically this invention provides a process for synthesizing phenoxybenzoic acid esters having the above general structure comprising:

1. esterifying a halobenzoyl halide with isopropyl alcohol;
2. nitrating the resulting halobenzoate ester;
3a. reacting a halophenol with an alkali metal carbonate, bicarbonate or hydroxide; and
3b. reacting the resulting alkali metal phenolate with the nitrated ester;
4. transesterifying the resulting halophenoxynitrobenzoate in an excess amount of an appropriate alcohol in the presence of a catalyst selected from the group consisting of alkali metal or alkali metal alkoxide to the desired phenoxybenzoic acid ester.

This invention also provides, in a process for synthesizing phenoxybenzoic acid esters, means for separating undesired isomeric impurities from the desired isopropyl nitrobenzoate ester intermediate comprising esterifying a halobenzoyl halide with isopropyl alcohol thereby facilitating separation of said isomeric impurities from the nitrated isopropyl ester. Thus, this application provides a means of conveniently nitrating the product of a halobenzoyl halide/isopropyl alcohol esterifying reaction, recovering same and then reacting such nitrobenzoate with a suitable alkali metal phenolate to obtain a halophenoxynitrobenzoate and subsequently transesterifying it to the desired halophenoxynitrobenzoate ester. The phenoxy derivative of the nitrated benzoate is accordingly transesterified to the desired halophenoxynitrobenzoic acid ester with an excess of an appropriate alcohol ($C_1$–$C_5$) in the presence of a catalyst selected from the group consisting of an alkali metal or alkali metal alkoxide.

DESCRIPTION OF SPECIFIC EMBODIMENTS

This invention, therefore, provides a multi-step process for synthesis in which phenoxybenzoic acid esters are prepared in high yield and high purity. Impurities associated with prior art processes are thus substantially eliminated or minimized within acceptable limits.

Non-limiting examples of compounds conveniently prepared according to this invention are:

methyl 5-(2',4'-dichlorophenoxy)-2-nitrobenzoate;
methyl 5-(2',4',6'-trichlorophenoxy)-2-nitrobenzoate;
propyl 5-(2',4',6'-tribromophenoxy)-2-nitrobenzoate;
methyl 5-(2',3',4',5',6'-pentachlorophenoxy)-2-nitrobenzoate;
n-pentyl 5-(2',4',6'-trichlorophenoxy)-2-nitrobenzoate;
methyl 5-(2'-chlorophenoxy)-2-nitrobenzoate;
ethyl 5-(2'-chloro-4'-fluorophenoxy)-2-nitrobenzoate;
methyl 5-(2',4'-dichloro-6'-fluorophenoxy)-2-nitrobenzoate;
methyl 5-(4'-chloro-2',6'-dibromophenoxy)-2-nitrobenzoate.

In general the invention comprises (1) esterification of a halobenzoyl halide, (2) nitration of the resulting ester, (3a) preparation of a phenol salt of an alkali metal carbonate, bicarbonate or hydroxide and (3b) reaction thereof with the nitrated ester and (4) transesterification of the nitrated phenoxy compound to the desired phenoxybenzoic acid ester.

In Step 1 a halobenzoyl halide, e.g., m-chlorobenzoyl chloride, is esterified with isopropanol. Nearly quantitative yields are obtained. The benzoyl halide can be a fluoride, bromide, or an iodide or combinations of two or more halides, such as chlorobenzoyl fluoride. Preferred compounds are chlorobenzoyl chloride and chlorobenzoyl fluoride. Alcohols other than isopropanol can be used. However, isopropanol is especially preferred. Step 2 involves the nitration of the ester. Nitration is conveniently accomplished in concentrated nitric acid (90–100%) with a mole ratio of nitric acid to ester substrate between about 5–20 to 1. The temperature of the nitration reaction can vary from about −50° to about +25° C or higher, e.g. with branched chain alcohols, temperatures of up to about +45° C are suitable. The distribution of isomers produced in the nitration step is believed to be temperature dependent. Generally, a progressively higher percentage of the desired 5-chloro-2-nitro isomer is obtained at lower temperatures.

Even though the desired isomer is the predominant product, separating it from unwanted isomers poses a difficult problem. The primary isomeric impurities are the 3-chloro-2-nitro and the 3-chloro-4-nitro. It is practically impossible to separate them from the desired isomer by distillation or chromatography, and repeated fractional crystallization is tedious and time consuming. However, if isopropyl alcohol is the esterifying agent, obtaining the desired isomer is greatly facilitated. The unique nature of the isopropyl esters is such that the desired isomeric ester (5-chloro-2-nitro) has the highest melting point and the major isomeric impurity (3-chloro-2-nitro) is an oil. Since, additionally, some of the 3-chloro-4-nitro can also be separated by a sustained vacuum filtration technique ultimate product yield and purity are greatly improved.

A typical composition of solids and oils obtained after work up of the isopropyl esters following nitration at −20° C is shown below:

| | %Yield | 5-Cl-2-NO$_2$ | 3-Cl-4-NO$_2$ | 3-Cl-2-NO$_2$ |
|---|---|---|---|---|
| Solid | 78.2 | 96.4 | 0.9 | 2.7 |
| Oil | 18.1 | 30.4 | 9.7 | 55.9 |

Subsequent recrystallation of the solid yields 98–99% purity of the desired isomer, however, recovery may be diminished because of the ready solubility of the compound in organic solvents. Nonetheless, applicant's discovery of the unique nature of the isopropyl esters significantly increases product purity and product yield.

The phenol salt may be prepared by a variety of known means from an alkali metal carbonate, bicarbonate or hydroxide in an aprotic organic solvent, such as dimethylacetamide, dimethylformamide or dimethylsulfoxide. Preferred alkali metals are Na and K. During the reaction an aromatic cosolvent, e.g. toluene or xylene can advantageously be used to remove water. Any suitable halophenol can be used. However, chlorophenols are preferred.

The alkali metal phenolate so produced is reacted with the nitrated ester produced in Step 2 above. This reaction can take place at temperatures from about 70° to 200° C, but preferably at about 140° to 160° C. The Step 3b reaction is accompanied by side reactions and the presence of undesired isomers which affect the purity of the desired product. Consequently the isopropyl ester intermediate is preferred because, as stated above, it minimizes these difficulties.

The purity and yield of the product recovered in Step 3b is also affected by various factors, interalia, the structure of the R group, the type of halogen in the intermediate product (isopropyl-5-chloro-2-nitrobenzoate) and the nucleophilicity of the phenol salt.

EXAMPLE OF YIELDS IN STEP 3b

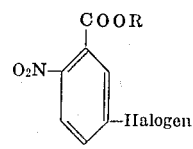

1) Dichlorophenol Salt

| R | Halogen | Maximum Isolatable Yield |
|---|---|---|
| Methyl | Cl | 60 |
| Ethyl | Cl | 85 |
| Isopropyl | Cl | 93 |

2) Trichlorophenol Salt

| R | Halogen | Maximum Isolatable Yield |
|---|---|---|
| Methyl | Cl | 28 |
| Methyl | Br | 35 |
| Ethyl | Cl | 45 |
| Isopropyl | Cl | 80 |

It is apparent, therefore, that the best yields with minimum by-products are obtained using the isopropyl ester intermediate.

In the final step, transesterification of the isopropyl ester of Step 3b to a desired phenoxybenzoic acid ester is accomplished. The transesterification can conveniently take place in a refluxing solution of an excess amount of the appropriate alcohol catalyzed by an alkali metal or the corresponding alkali metal alkoxide. Preferably the corresponding alkoxide is used. Appropriate alcohols are, e.g. lower alkyl ($C_1$–$C_5$) such as methyl or ethyl. Any alkali metal is suitable. Na or K are preferred.

The percentage of conversion to the desired phenoxybenzoic acid ester varies with the molar amount of the alcohol used. A 25:1 molar ratio of alcohol to the isopropyl ester intermediate yields about a 96% conversion. This amount of solvent is also most convenient for isolation of the desired product which precipitates directly from the reaction solution. Yields in the range of 85–90% are readily obtained with product purity of about 99%. The residue from the mother liquor may be reworked to obtain additional product.

The nature of the catalyst is apparently critical since only alkali metal or alkali metal alkoxide catalysts have proven to be very effective for the transesterification. About 3 to 10 molar percent of the catalyst is usually required.

The Step 3b product, halophenoxynitrobenzoate ester, can be isolated and recovered. Alternatively immediately after vacuum distillation of the solvent of Step 3a, the transesterification alcohol and catalyst can be added directly to the residue and transesterification to the desired phenoxybenzoate ester accordingly carried out. Residual alkali metal chloride from Step 3b may be removed from the warm solution by filtration before precipitation of the desired product to further insure purity. Furthermore, when R is isopropyl Step 4 is no longer necessary. Otherwise, however, the number of steps and their sequence is extremely critical to successful operation of this invention.

Thus applicant's discovery of the unique nature of isopropyl esters, and their facile transesterification has resulted in the novel combination of process steps detailed above which allows greater yield and product purity than known heretofore in the preparation of the subject phenoxybenzoic acid esters.

The following detailed examples are intended as illustrations rather than limitations on the scope of this invention so as to provide a better understanding of the nature, objects and advantages of the invention.

EXAMPLE 1

Preparation of Isopropyl 3-Chlorobenzoate

Isopropyl alcohol (66.0g, 1.1 mole) was added slowly to stirred 3-chlorobenzoyl chloride (175.0g, 1.0 mole) as the temperature was raised from 25° to about 85° C. A slight exotherm was controlled by adjustment of the addition rate. Most of the hydrochloric acid produced in the reaction was evolved during a 2-3 hr. reflux period. Excess isopropyl alcohol and residual hydrochloric acid were removed by application of an aspirator vacuum. The resulting pale yellow liquid product weighed 196.5g (99% yield-99% purity).

EXAMPLE 2

Preparation of Isopropyl 5-Chloro-2-Nitrobenzoate

Isopropyl 3-Chlorobenzoate (196.5g, 0.99 mole) was added dropwise to a −20° C stirred solution of 95% nitric acid (664g, 10.0 moles) over a 30 minute period. The temperature was maintained at −20° C for 3 hours and then raised to +20° C. About 80% of the nitric acid was removed by vacuum distillation giving a concentration of ca. 95% which can be directly reused in subsequent reactions. The residue was diluted with ice water (400 ml). The pale yellow solid precipitate was filtered and washed twice with water (100 ml). Purification was achieved by a sustained vacuum filtration is a sintered glass funnel for a period of about 24-30 hours to remove most of the oil. The dried solid amounted to 192.7g (80% yield -96% purity) and melted at 56°-58° C.

EXAMPLE 3

Preparation of Isopropyl 5-(2',4'-Dichlorophenoxy)-2-Nitrobenzoate

Solid potassium carbonate (60.5g, 0.44 mole) was added to a stirred solution of 2,4 dichlorophenol (135.5g, 0.83 moles) in dimethylformamide (DMF) (320 ml). The temperature was raised to reflux for 1 hour evolving carbon dioxide. Approximately one-half of the DMF solvent was removed by distillation along with the water formed in the reaction. Isopropyl 5-chloro-2-nitrobenzoate (192.5g, 0.79 moles) was added in one portion to the 150°-160° C stirred solution of the phenol salt. The reaction temperature dropped to ca. 120° C, but was raised back to 150° C. The reaction mixture was stirred for an additional 1 ½ hours during which time a large amount of potassium chloride precipitated. An aspirator vacuum was applied and 90% of the remaining DMF was removed by distillation. Upon cooling, the residue was suspended in water (500 ml) with vigorous stirring to give a finely divided yellow precipitate. The solid was filtered, washed twice with water (200 ml) and dried to give 266g (91% yield-93% purity) with a melting point of 54°-58°C.

EXAMPLE 4

Preparation of Methyl 5-(2',4'-Dichlorophenoxy)-2-Nitrobenzoate

A stirred solution of isopropyl 5-(2',4'-dichlorophenoxy)-2-nitrobenzoate (266g, 0.72 mole) and a catalytic amount of sodium methoxide (2.7g, 0.05 mole) in absolute methanol (560g, 18.0 moles) was refluxed for about 4 hours. Upon cooling the solution to 5° C a yellow solid precipitated. After stirring for 1 hour the solid was filtered and washed with low boiling petroleum either (200 ml). The dried solid amounted to 204g (83% yield-99% purity) and melted at 85°-87° C.

EXAMPLE 5

Preparation of Ethyl 5-(2',4'-dichlorophenoxy)-2-Nitrobenzoate

A procedure analogous to that of Example 4 was used through the intermediate steps (1-3b). Transesterification to the ethyl ester was accomplished with ethanol as reactant-solvent. The dried solid was obtained in 78% yield and 98% purity and melted at 83°-85° C.

EXAMPLE 6

Preparation of Methyl 5-(2',4',6'-trichlorophenoxy)-2-Nitrobenzoate

A procedure analogous to Example 4 was used throughout. The analogous Example 3 intermediate, isopropyl 5-(2',4',6'-trichlorophenoxy)-2-nitrobenzoate, starting from 2,4,6-trichlorophenol was obtained in 65% yield and 95% purity after crystallization from petroleum ether and melted at 71°-74° C. Transesterification was with methanol in a procedure similar to that of Example 4. The solid product was obtained in 84% yield and 99% purity, melting at 101°-103° C.

Other disclosed compounds not exemplified in the examples are prepared in similar manner and are intended within the scope of this invention.

What is claimed is:

1. In a process for synthesizing phenoxybenzoic acid esters having the following general structure:

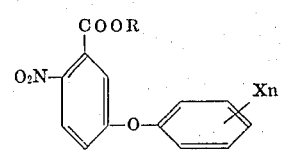

wherein R is alkyl ($C_1$–$C_5$), X is selected from the group consisting of hydrogen, iodine, fluorine, chlorine, bromine and combinations thereof, and $n$ is an integer of from 2 to 5, the improvement which comprises (1) esterifying a halobenzoyl halide with isopropyl alcohol at a temperature from about 25° C to about 85° C to produce a halobenzoate ester, (2) nitrating the halobenzoate ester at a temperature of from about −50° to about +45° C with nitric acid in a mole ratio of nitric acid to ester substrate of between about 5:1 to about 20:1; (3) reacting the resulting isopropyl nitrobenzoate thereby produced with an alkali metal phenolate at a temperature of from about 70° to about 200° C to obtain an isopropyl halophenoxynitrobenzoate ester; (4) and, when the desired halophenoxynitrobenzoic acid ester is other than the isopropyl ester, transesterifying said isopropyl ester with a molar excess of a lower ($C_1$–$C_5$) alkyl alcohol other than isopropanol in the presence of a catalyst selected from the group consisting of alkali metals and alkali metal alkoxides to obtain the desired phenoxybenzoic acid ester.

2. The process of claim 1 where the halobenzoyl halide is selected from the group consisting of chloro-, and fluorobenzoyl chloride or fluoride and combinations thereof.

3. The process of claim 2 where the halide is m-chlorobenzoyl chloride.

4. The process of claim 1 where the alcohol contains from one to five carbon atoms.

5. The process of claim 4 where the alcohol is methanol.

6. The process of claim 1 where the desired halophenoxynitrobenzoic acid ester is methyl 5-(2',4'-dichlorophenoxy)-2-nitrobenzoate.

7. The method of claim 1 where the alcohol and catalyst are added directly to the reaction residue of Step 3 without recovering the isopropyl halophenoxynitrobenzoate ester.

8. The method of claim 1 where the halobenzoate ester in nitrated at about −20° to +45° C.

9. A method of making methyl 5-(2',4'-dichlorophenoxy)-2-nitrobenzoate comprising (1) esterifying m-chlorobenzoyl chloride with isopropyl alcohol at a temperature of from about 25° to about 85° C; (2) nitrating the resulting chlorobenzoate ester at a temperature from about −20° to about +20° C in nitric acid in a mole ratio of nitric acid to ester substrate of about 5:1 to 10:1; (3) reacting 2,4-dichlorophenolate with the nitrated halobenzoate ester from step (2) to produce isopropyl 5-(2',4'-dichlorophenoxy)-2-nitrobenzoate; (4) and transesterifying the isopropyl ester from step (3) with a molar excess of methyl alcohol in the presence of a catalyst selected from the group consisting of alkali metals and alkali metal alkoxides to obtain methyl 5-(2',4'-dichlorophenoxy)-2-nitrobenzoate.

* * * * *